(12) United States Patent
Holmbacka (10) Patent No.: US 12,376,028 B2
(45) Date of Patent: Jul. 29, 2025

(54) ENERGY SAVING MANAGEMENT FOR COMMUNICATION NETWORKS

(71) Applicant: Elisa Oyj, Helsinki (FI)

(72) Inventor: Simon Holmbacka, Helsinki (FI)

(73) Assignee: Elisa Oyj, Helsinki (FI)

( * ) Notice: Subject to any disclaimer, the term of this patent is extended or adjusted under 35 U.S.C. 154(b) by 398 days.

(21) Appl. No.: 18/245,459

(22) PCT Filed: Aug. 30, 2021

(86) PCT No.: PCT/FI2021/050583
§ 371 (c)(1),
(2) Date: Mar. 15, 2023

(87) PCT Pub. No.: WO2022/058648
PCT Pub. Date: Mar. 24, 2022

(65) Prior Publication Data
US 2023/0276355 A1    Aug. 31, 2023

(30) Foreign Application Priority Data
Sep. 21, 2020    (FI) ...................................... 20205909

(51) Int. Cl.
*H04W 52/02*    (2009.01)
(52) U.S. Cl.
CPC ............................... *H04W 52/0206* (2013.01)
(58) Field of Classification Search
CPC ......... H04W 52/0206; H04W 52/0216; H04W 76/28; Y02D 30/70
See application file for complete search history.

(56) References Cited

U.S. PATENT DOCUMENTS 6,584,330 B1    6/2003    Ruuska
11,419,054 B2 *    8/2022    Han .................. H04W 52/0251
(Continued)

FOREIGN PATENT DOCUMENTS

EP    2705715 A1    3/2014

OTHER PUBLICATIONS

Wu, J. et al. Energy-Efficient Base-Stations Sleep-Mode Techniques in Green Cellular Networks: A Survey. In: IEEE Communications Surveys & Tutorials. IEEE [online], Feb. 2015, vol. 17, No. 2, pp. 803-826.

(Continued)

*Primary Examiner* — Chandrahas B Patel
(74) *Attorney, Agent, or Firm* — ZIEGLER IP LAW GROUP, LLC.

(57) ABSTRACT

A computer implemented method for energy savings management for cells of a sector or a base station of a communication network. The sector or base station has co-located cells that operate on different frequency bands. The method is performed by obtaining a default energy savings plan that calls for fully shutting down at least one of the cells for a first time period and provides a first amount of energy savings; evaluating energy savings achievable by using partial shutdown in cells and determining a second time period of partial shutdown that is needed for achieving the first amount of energy savings; obtaining a third time period that is usable for energy savings actions; and choosing to use partial shutdown in the cells, if the second time period is shorter than the third time period, and else choosing to use the default energy saving plan.

12 Claims, 4 Drawing Sheets

(56) References Cited

U.S. PATENT DOCUMENTS

| | | | |
|---|---|---|---|
| 2012/0106349 A1* | 5/2012 | Adjakple | H04W 52/0212 |
| | | | 370/241 |
| 2012/0244869 A1 | 9/2012 | Song et al. | |
| 2014/0194110 A1 | 7/2014 | Suerbaum et al. | |
| 2021/0014784 A1* | 1/2021 | Kneckt | H04W 52/0209 |
| 2023/0247559 A1* | 8/2023 | Ghelichi | H04W 24/10 |
| | | | 370/311 |

OTHER PUBLICATIONS

European Patent Office, International Search Report, International Application No. PCT/FI2021/050583, mailed Dec. 3, 2021, 2 pages.

* cited by examiner

301. Obtain default energy savings plan with full shutdown for n hours

302. Evaluate energy savings achievable by partial shutdown

303. Determine how many hours m of partial shutdown correspond to full shutdown for n hours 304. Obtain hours p that are usable for energy savings actions 305. Use partial shutdown if m<p, else use the default energy savings plan 306. Use partial shutdown at least for m hours 307. Use partial shutdown for r hours, wherein $m \leq r \leq p$ 308. Repeat

ENERGY SAVING MANAGEMENT FOR COMMUNICATION NETWORKS

TECHNICAL FIELD

The present application generally relates to energy saving management for communication networks.

BACKGROUND

This section illustrates useful background information without admission of any technique described herein representative of the state of the art.

Communication networks comprise a plurality of cells serving users of the network. As the load in the network increases, new cells are deployed to increase capacity of the network. This results in increased energy consumption.

On the other hand, there is a constant desire to minimize energy consumption. For example, advanced chip technology, data center optimization, and power save modes are employed in communication networks in order to reduce energy consumption. Still further load in the network is not constant, and therefore all available capacity is not always in use.

Now a new approach is provided for managing energy saving in communication networks.

SUMMARY

The appended claims define the scope of protection. Any examples and technical descriptions of apparatuses, products and/or methods in the description and/or drawings not covered by the claims are presented not as embodiments of the disclosed embodiments but as background art or examples useful for understanding the disclosed embodiments.

According to a first example aspect of the present disclosure there is provided a computer implemented method for energy savings management for cells of a sector or base station of a communication network, wherein the sector or base station comprises at least two co-located cells that operate on different frequency bands. The method comprises
  Obtaining default energy savings plan, wherein the default energy savings plan calls for fully shutting down at least one of the cells of the sector or base station for a first time period and provides a first amount of energy savings;
  evaluating energy savings achievable by using partial shutdown in cells of the sector or base station and determining a second time period of partial shutdown that is needed for achieving the first amount of energy savings;
  obtaining a third time period that is usable for energy savings actions; and choosing to use partial shutdown in the cells of the sector or base station, if the second time period is shorter than the third time period, and else choosing to use the default energy savings plan.

In some example embodiments, the partial shutdown is implemented by shutting down one or more multiple input multiple output, MIMO, antenna branches in cells of the sector or base station.

The method may be repeated periodically in order to continuously adjust the shutdown actions.

In some example embodiments, evaluation of the energy savings achievable by using partial shutdown is based on linear interpolation over the third time period.

In some example embodiments, evaluation of the energy savings achievable by using partial shutdown is based on measurements of energy consumption with a 0-10% load in the cells of the sector or base station.

In some example embodiments, duration of the first time period is static, e.g. static number of hours. Alternatively, duration of the first time period may vary dynamically.

In some example embodiments, choosing to use partial shutdown in the cells of the sector or base station comprises choosing to use partial shutdown in the cells of the sector or base station at least for the duration of the third time period.

In some example embodiments, wherein choosing to use partial shutdown in the cells of the sector or base station comprises choosing to use partial shutdown in at least one of the cells of the sector or base station for a fourth time period, wherein duration of the fourth time period is between the duration of the second time period and the duration of the third time period.

In some example embodiments, choosing to use partial shutdown in the cells of the sector or base station comprises choosing to use partial shutdown in at least one of the cells of the sector or base station for the duration of the third time period. In this way, energy savings may be further increased in comparison to the default plan.

According to a second example aspect of the present disclosure, there is provided an apparatus comprising a processor and a memory including computer program code; the memory and the computer program code configured to, with the processor, cause the apparatus to perform the method of the first aspect or any related embodiment.

According to a third example aspect of the present disclosure, there is provided a computer program comprising computer executable program code which when executed by a processor causes an apparatus to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of the first aspect or any related embodiment.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

As there are time periods during which all available capacity of a network is not in use, it is possible to temporarily shut down some cells of the network. Some cells may be shut down for example during night time. It is possible to use default shut down periods such as from 1 am to 6 am or dynamically varying shutdown periods that vary e.g. based on actual load in respective cell and/or based on other factors.

It is possible to fully shut down selected cells or to use partial shutdown. Partial shutdown may be implemented by shutting down one or more MIMO (multiple input multiple output) antenna branches in the cell. By partial shutdown the cell does not fully disappear from the network but continues to provide service to a smaller area and/or on lower speed or throughput. In this way, disturbance caused by the cell shutdown to the neighborhood is reduced.

Various embodiments of present disclosure provide mechanisms for deciding when to use full cell shutdown and when to use partial cell shutdown. Some example embodiments are based on an assumption that certain amount of energy savings should be obtained by the shutdown actions.

Figure 1:
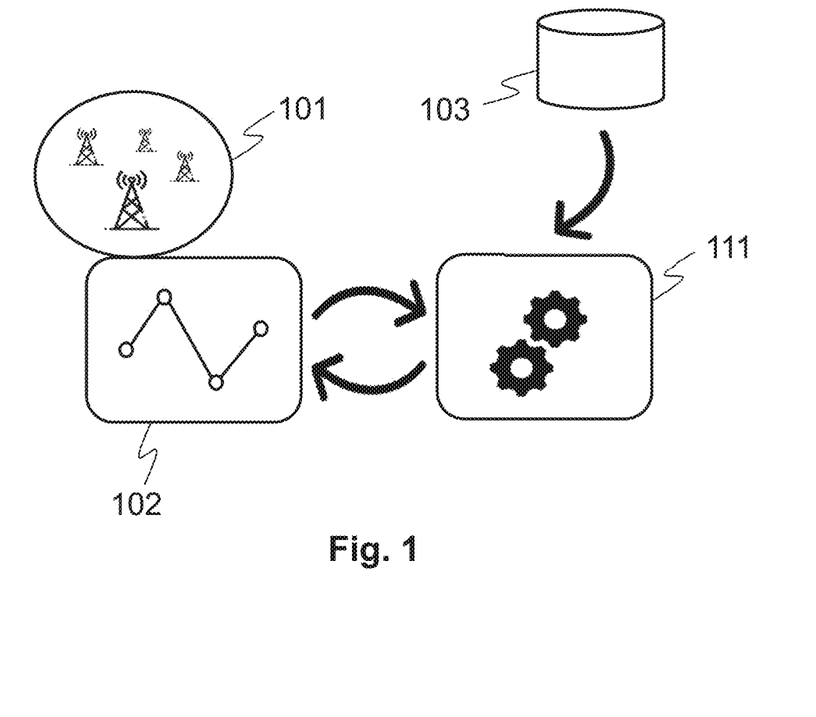
FIG. 1 schematically shows an example scenario according to an example embodiment.

FIG. 1 schematically shows an example scenario according to an embodiment. The scenario shows a communication network 101 comprising a plurality of cells and base stations and other network devices, and an operations support system, OSS, 102 configured to manage operations of the communication network 101. Further, the scenario shows an automation system 111 and a database element 103. The automation system 111 is configured to implement automated energy saving management for the communication network 101. The automation system 111 is operable to interact with the OSS 102 for example to receive data from the OSS 102 and to provide settings and configurations to the OSS 102 for use in the communication network 101. The database element 103 is configured to store measurement results, and the automation system 111 is operable to interact with the database element 103 to read measurement results stored therein. It is to be noted that alternatively measurement results that may be needed in some example embodiments may be stored in the automation system 111 or otherwise provided for use in the automation system 111.

The automation system 111 is configured to implement at least some example embodiments of present disclosure.

Figure 2:
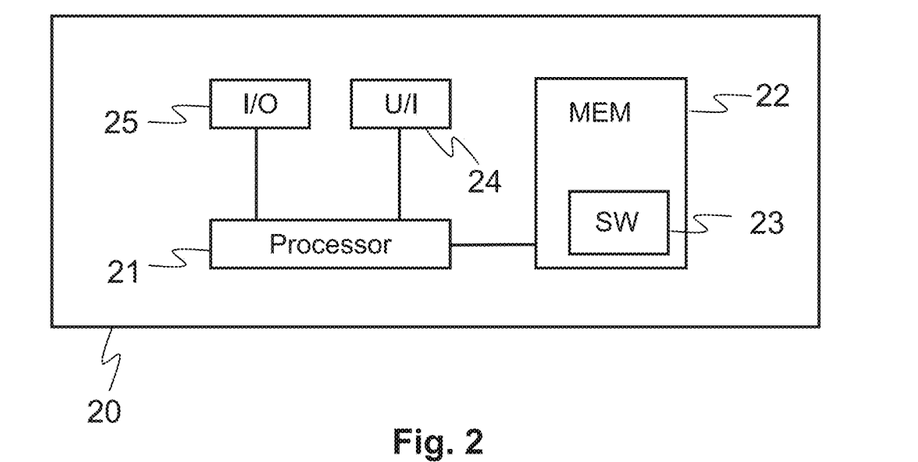
FIG. 2 shows a block diagram of an apparatus according to an example embodiment.

FIG. 2 shows a block diagram of an apparatus 20 according to an embodiment. The apparatus 20 is for example a general-purpose computer or server or some other electronic data processing apparatus. The apparatus 20 can be used for implementing at least some embodiments of the disclosure. That is, with suitable configuration the apparatus 20 is suited for operating for example as the automation system 111 of foregoing disclosure.

The apparatus 20 comprises a communication interface 25; a processor 21; a user interface 24; and a memory 22. The apparatus 20 further comprises software 23 stored in the memory 22 and operable to be loaded into and executed in the processor 21. The software 23 may comprise one or more software modules and can be in the form of a computer program product.

The processor 21 may comprise a central processing unit (CPU), a microprocessor, a digital signal processor (DSP), a graphics processing unit, or the like. FIG. 2 shows one processor 21, but the apparatus 20 may comprise a plurality of processors.

The user interface 24 is configured for providing interaction with a user of the apparatus. Additionally or alternatively, the user interaction may be implemented through the communication interface 25. The user interface 24 may comprise a circuitry for receiving input from a user of the apparatus 20, e.g., via a keyboard, graphical user interface shown on the display of the apparatus 20, speech recognition circuitry, or an accessory device, such as a headset, and for providing output to the user via, e.g., a graphical user interface or a loudspeaker.

The memory 22 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories. The memory 22 may serve the sole purpose of storing data, or be constructed as a part of an apparatus 20 serving other purposes, such as processing data.

The communication interface 25 may comprise communication modules that implement data transmission to and from the apparatus 20. The communication modules may comprise a wireless or a wired interface module(s) or both. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. The communication interface 25 may support one or more different communication technologies. The apparatus 20 may additionally or alternatively comprise more than one of the communication interfaces 25.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the disclosure may equally be implemented in a cluster of shown apparatuses.

Figure 3:
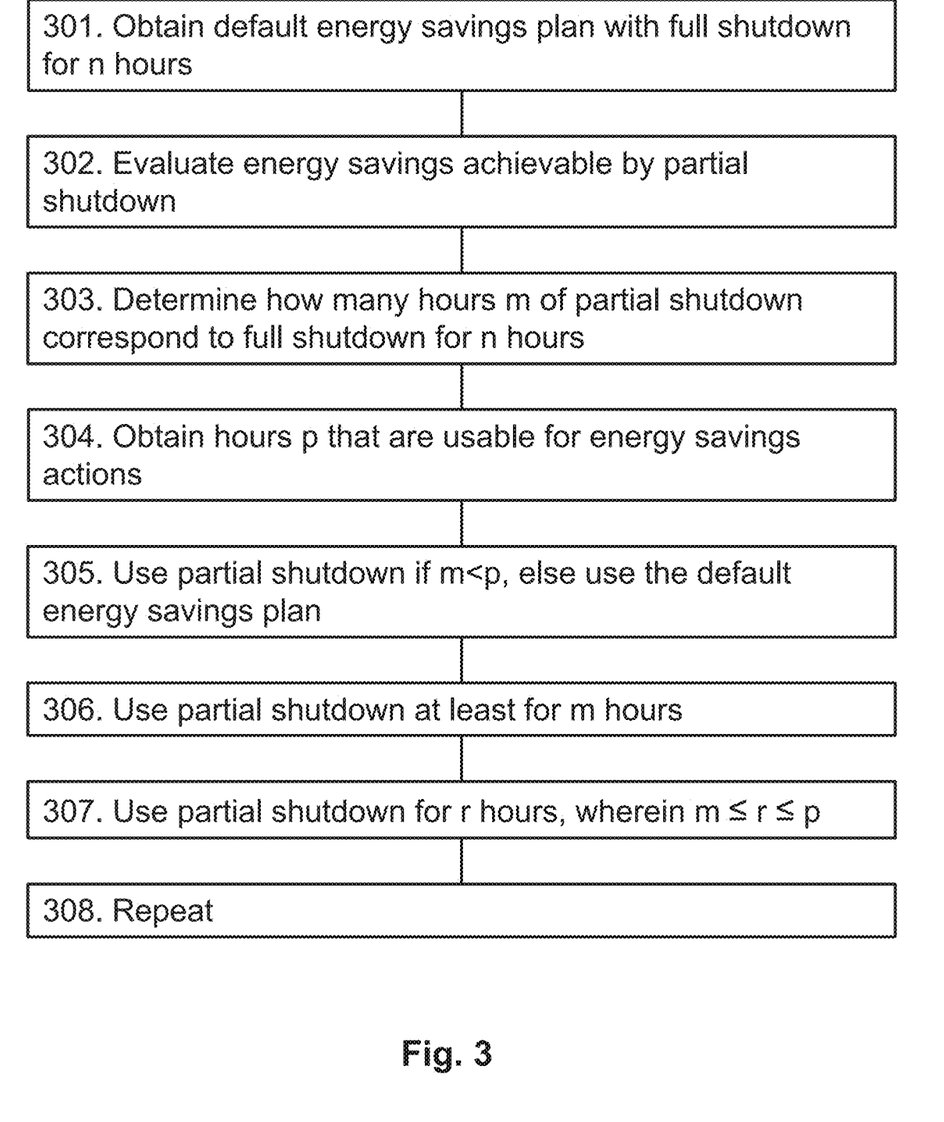
FIG. 3 shows a flow diagram illustrating example methods according to certain embodiments.

FIG. 3 shows a flow diagram illustrating example methods according to certain embodiments. The methods may be implemented in the automation system 111 of FIG. 1 and/or in the apparatus 20 of FIG. 2. The methods are implemented in a computer and do not require human interaction unless otherwise expressly stated. It is to be noted that the methods may however provide output that may be further processed by humans and/or the methods may require user input to start. Different phases shown in the flow diagrams may be combined with each other and the order of phases may be changed except where otherwise explicitly defined. Furthermore, it is to be noted that performing all phases of the flow diagram is not mandatory.

The method of FIG. 3 provides energy savings management for a communication network. The method is applied to base station sites that comprise at least two co-located cells that operate on different frequency bands. Co-located cells have at least partially overlapping, although not necessarily identical, coverage area. That is, there are two or more overlapping network layers. The method may be applied to a whole base station or to a certain sector or antenna bearing of the base station. There may be for example a plurality of LTE (long term evolution) cells that operate on different frequency bands. In one scenario, there are 800 MHz LTE cell(s) and 1800 MHz LTE cell(s). In another scenario, there are 1800 MHz LTE cell(s) and 2600 MHz LTE cell(s). In yet another scenario, there are 800 MHz LTE cell(s), 1800 MHz LTE cell(s), and 2600 MHz LTE cell(s). In still another scenario, there are 800 MHz LTE cell(s), 1800 MHz LTE cell(s), 2100 MHz LTE cell(s), and 2600 MHz LTE cell(s). Still further, it is to be noted that these are illustrative examples and presently disclosed embodiments can be used in other scenarios and with other technologies in addition to the LTE technology, too, and also with various hardware and software versions. It is to be noted that also sites that have only one layer (i.e. one frequency band) can be considered, although in such case, full shutdown plan is clearly not usable. Nevertheless, partial shutdown can be used to achieve energy savings.

The method of FIG. 3 comprises the following phases:

301: Default energy save plan is obtained. The default energy save plan calls for fully shutting down at least one of the cells of the base station or at least one of the cells of a sector for the duration of a first time period. In this example the duration of the first time period is n hours. Accordingly the default energy save plan provides a first amount of energy savings. The first amount of energy savings depends in general on the number of hours n (duration of the first time period) and the operating scenario. Certain type of combination of cells usually consumes a different amount of energy compared to other types of cell combinations. That is, also the energy savings that can be achieved vary depending on the cell scenario. In any case, the first amount of energy savings may be based on configuration information, information provided by network equipment vendor and/or energy consumption measurements.

The number of hours n may be for example 3-7 hours. In an example case, n=5.

The default energy savings plan may be a static setting defined by a network designer and the default plan may be obtained for example from a network planning tool. Alternatively, the number of hours n may vary dynamically for example on the basis of load in the respective base station, sector or cell, and/or on the basis of geographical location of the base station, sector or cell, and/or on the basis of some other factors.

302: It is evaluated how much energy savings would be achievable by using partial shutdown in cells of the sector or the base station.

The partial shutdown may be implemented by shutting down one or more multiple input multiple output, MIMO, antenna branches in cells of the sector or the base station.

In an embodiment, the amount of energy savings is based on measurements made for different base station scenarios or sector scenarios. Additionally or alternatively, configuration information and/or information provided by network equipment vendor can be employed. In an embodiment, partial shutdown is employed in all cells of the sector or the base station. Alternatively, partial shutdown may be employed in some of the cells. These are different scenarios to be taken into account in the measurements.

In an embodiment, the measurements provide the amount of energy savings achieved during a one hour period and a linear interpolation over time is used for finding out the amount of energy savings achievable for a longer period of time. Clearly some other period than one hour may be as well used as basis for the linear interpolation.

It is further noted that also the load of the cells affects the energy consumption and thereby the amount of achievable energy savings. It can be assumed that in practice energy savings actions are possible, if cell load is in the range 0%-10%, or in the range 0%-20%. If the load is higher, it is likely that energy savings actions cannot be used due to deterioration in quality of service. Based on this, the amount of achievable energy savings is, in an embodiment, based on an interpolation between measurement results achieved with 0% load and with 10% load. Alternatively, the upper limit may be between 5% and 20%. In yet another alternative, measurement results achieved with 0% load, 5% load, 10% load or with some other load in the range 0-20% could be used as such.

In an embodiment, measurements are performed for different base station scenarios or sector scenarios and the measurement results are stored for example in a database, such as the database element 103 of FIG. 1, or other storage for later use. In practice, the measurements can be done by connecting a power meter instrument to a RF module of each cell of a base station. Then, an energy savings plan is selected for the cells (that is, full shutdown of selected cells, partial shutdown in selected cells, partial shutdown in all cells), and a selected workload is issued on the cells. Measurements are then performed for different combinations of cell types, energy savings plans and workloads. The measurements may be continued for a one hour period (or for some other time period) and energy savings estimates for longer periods can be determined by linear interpolation.

In an example case, measurements are made for an example base station scenario with 3 antenna directions (bearings). There is a configuration that comprises co-located 800 MHz and 1800 MHz LTE cells. With 0% load, energy savings achieved in the base station over a one hour time period is 89 W with partial shutdown in all cells and 213 W with full shutdown of the 1800 MHz LTE cells. With 10% load, energy savings achieved in the base station over a one hour time period is 93 W with partial shutdown in all cells and 387 W with full shutdown in 1800 MHz LTE cells.

303: Duration of a second time period is determined. The second time period indicates duration of partial shutdown that is needed for achieving the first amount of energy savings. In this example the duration of the second time period is m hours. The number of hours (the duration of the second time period) is determined based on information from the phases 301 and 302.

304: Duration of a third time period usable for energy savings actions is obtained. In this example the duration of the third time period is p hours. The number p (the duration of the third time period) may depend on load in the cells or on some other factors.

305: The number of hours m needed for partial shutdown (the duration of the second time period) and the number of hours p usable for energy savings actions (the duration of the third time period) are compared. If m<p, i.e. the second time period needed for partial shutdown is shorter than the third time period usable for energy savings actions, partial shutdown is chosen, and else the default energy saving plan is chosen.

306: In an embodiment, it is chosen that partial shutdown is used at least for m hours. By using the partial shutdown for m hours, the same amount of energy savings can be achieved as would have been achieved with full shutdown of the default energy savings plan.

307: In an embodiment, it is chosen that partial shutdown is used for r hours at least in one cell or in all cells, wherein r is larger or equal to m and smaller or equal to p. In more general terms, the number of hours r may be referred to as a fourth time period. In this way, the amount of energy savings may be increased from the amount that would be achievable with full shutdown of the default energy savings plan. By using partial shutdown for p hours in all cells, the amount of energy savings may be maximized.

308: The method phases are repeated to continuously adjust the energy savings actions.

It is to be noted that in the example of FIG. 3, the duration of different time periods is defined in terms of number of hours, but it is not mandatory to use time periods that are multiples of a one hour period. Instead some other definition can be used. The lengths of the time periods may be defined for example in minutes.

Figure 4:
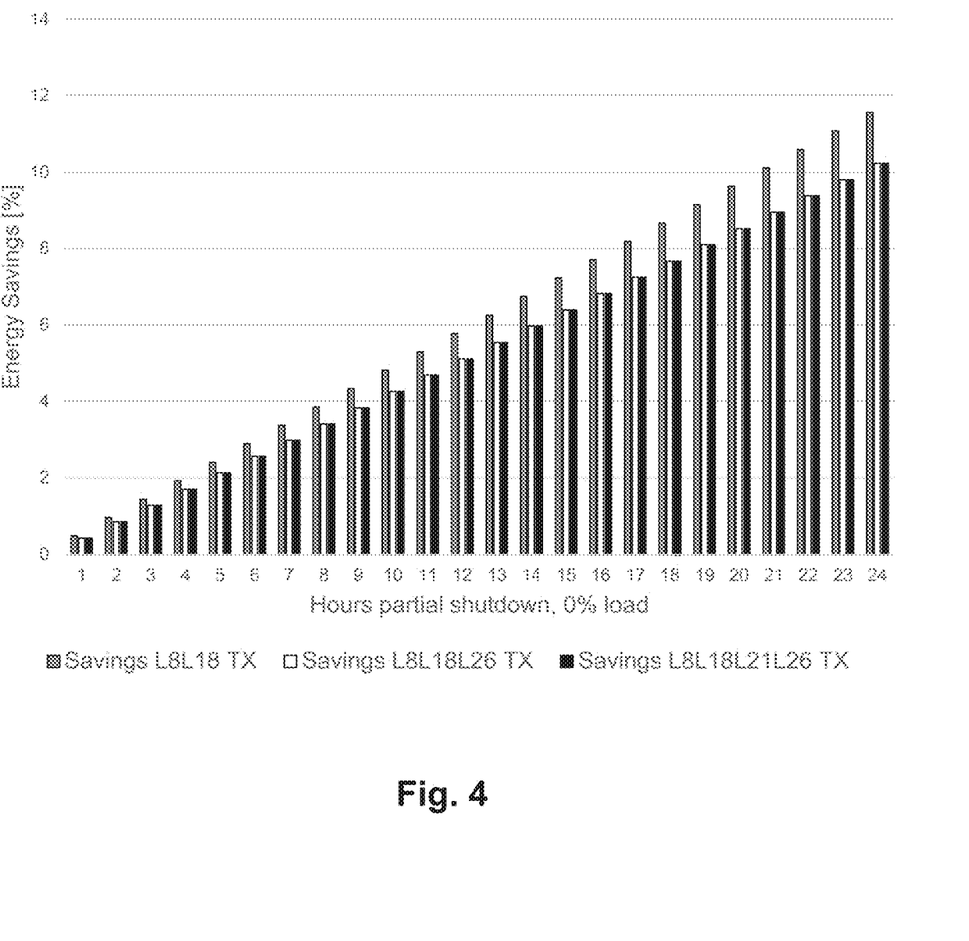
FIGS. 4-5 show graphs illustrating some example cases.
Figure 5:
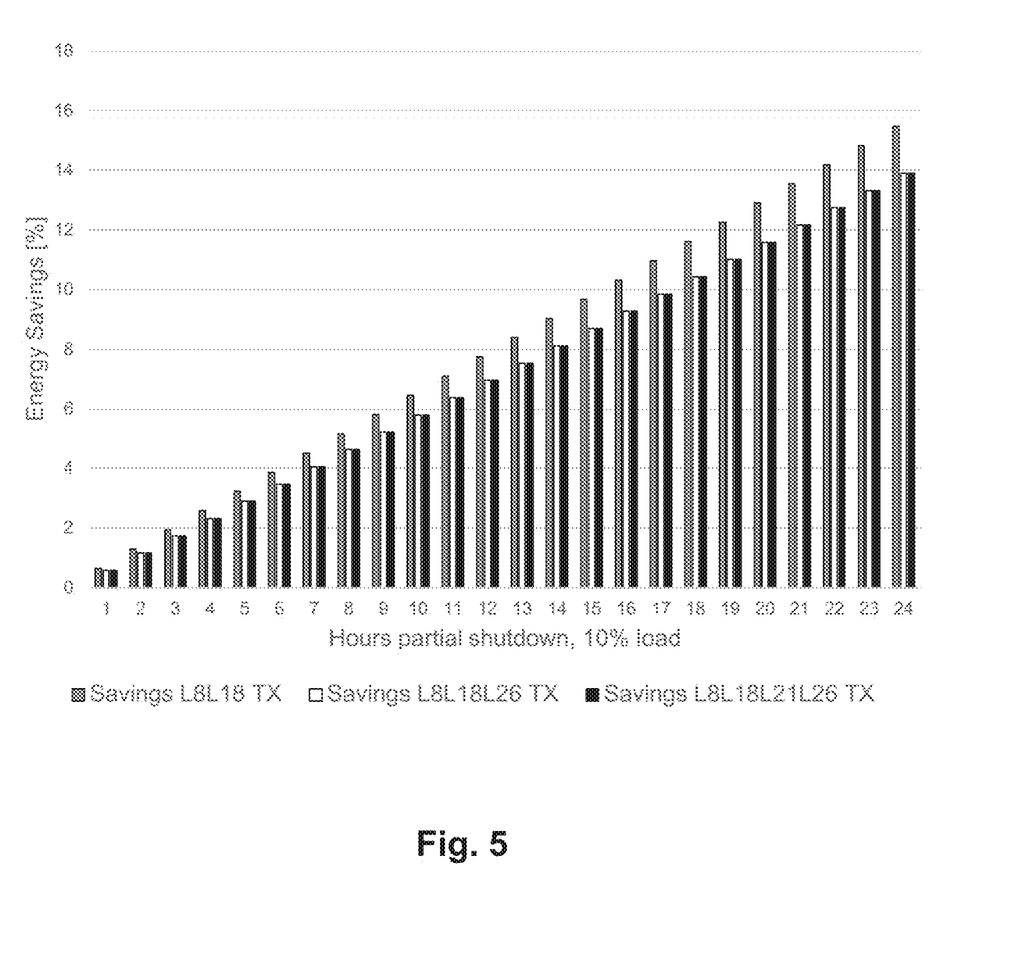

FIGS. 4-5 show graphs illustrating some example cases. The graphs show linear interpolation of measured energy savings over a 24-hour period for three different sector configurations. A first configuration comprises a 800 MHz LTE cell and a 1800 MHz LTE cell (Savings L8L18 TX in FIGS. 4-5). A second configuration comprises a 800 MHz LTE cell, a 1800 MHz LTE cell, and a 2600 MHz LTE cell (Savings L8L18L26 TX in FIGS. 4-5). A third configuration comprises a 800 MHz LTE cell, a 1800 MHz LTE cell, a 2100 MHz LTE cell, and a 2600 MHz LTE cell (Savings L8L18L21L26 TX in FIGS. 4-5). Cell load in the example of FIG. 4 is 0% and cell load in the example of FIG. 5 is 10%.

In some example embodiments, the values from the graphs of FIGS. 4 and 5 are compared to the first amount of energy savings achievable by a default energy savings plan of the respective sector configuration. In an example case, with the first configuration, wherein the duration of the full shutdown is 5 hours and load=0%, the first amount of energy savings is 5.76%, and with the second configuration, wherein the duration of the full shutdown is 5 hours and load=0%, the first amount of energy savings is 4.49%. Based on this it can be concluded that with the first configuration and 0% load, partial shutdown for 12 hours is needed to achieve the first amount of energy savings, and with the second configuration and 0% load, partial shutdown for 11 hours is needed to achieve the first amount of energy savings.

In another example case, with the first configuration, wherein the duration of the full shutdown is 5 hours and load=10%, the first amount of energy savings is 6.91%, and with the second configuration, wherein the duration of the full shutdown is 5 hours and load=10%, the first amount of energy savings is 4.99%. Based on this it can be concluded that with the first configuration and 10% load, partial shutdown for 11 hours is needed to achieve the first amount of energy savings, and with the second configuration and 10% load, partial shutdown for 9 hours is needed to achieve the first amount of energy savings.

Without in any way limiting the scope, interpretation, or application of the appended claims, a technical effect of one or more of the example embodiments disclosed herein is an energy savings management model that automatically adapts to using partial cell shutdown where possible and/or advantageous. In this way, full shutdown of cells may be reduced while at the same time providing the same energy savings as would be available by full cell shutdown. Some embodiments may provide even increase in energy savings compared to the amount that would be available with full cell shutdown.

Another technical effect of one or more of the example embodiments is that mobility disturbance to neighboring sectors may be reduced as partial cell shutdown can be used. By partial shutdown the cell does not fully disappear from the network but continues to provide roughly the same coverage, but at a reduced capacity. In this way, the neighborhood is less affected compared to full cell shutdown which forces other cells to take over the entire load of the shutdown cell.

If desired, the different functions discussed herein may be performed in a different order and/or concurrently with each other. Furthermore, if desired, one or more of the before-described functions may be optional or may be combined.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the present disclosure. It is however clear to a person skilled in the art that the present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present invention, and not in limitation thereof. Hence, the scope of the disclosed embodiments is only restricted by the appended patent claims.

The invention claimed is:

1. A computer implemented method for energy savings management for cells of a sector or base station of a communication network, wherein the sector or base station comprises at least two co-located cells that operate on different frequency bands, the method comprising
   obtaining default energy savings plan, wherein the default energy savings plan calls for fully shutting down at least one of the cells of the sector or base station for a first time period and provides a first amount of energy savings;
   evaluating energy savings achievable by using partial shutdown in cells of the sector or base station and determining a second time period of partial shutdown that is needed for achieving the first amount of energy savings;
   obtaining a third time period that is usable for energy savings actions; and
   choosing to use partial shutdown in the cells of the sector or base station, if the second time period is shorter than the third time period, and else choosing to use the default energy savings plan.

2. The method of claim 1, wherein the partial shutdown is implemented by shutting down one or more multiple input multiple output, MIMO, antenna branches in cells of the sector or base station.

3. The method of claim 1, further comprising periodically repeating the method.

4. The method of claim 1, wherein evaluation of the energy savings achievable by using partial shutdown is based on linear interpolation over the third time period.

5. The method of claim 1, wherein evaluation of the energy savings achievable by using partial shutdown is based on measurements of energy consumption with a 0-10% load in the cells of the sector or base station.

6. The method of claim 1, wherein duration of the first time period is static.

7. The method of claim 1, wherein duration of the first time period varies dynamically.

8. The method of claim 1, wherein choosing to use partial shutdown in the cells of the sector or base station comprises choosing to use partial shutdown in the cells of the sector or base station at least for the duration of the third time period.

9. The method of claim 1, wherein choosing to use partial shutdown in the cells of the sector or base station comprises choosing to use partial shutdown in at least one of the cells of the sector or base station for a fourth time period, wherein duration of the fourth time period is between the duration of the second time period and the duration of the third time period.

10. The method of claim 1, wherein choosing to use partial shutdown in the cells of the sector or base station comprises choosing to use partial shutdown in at least one of the cells of the sector or base station for the duration of the third time period.

11. An apparatus comprising
   a processor, and
   a memory including computer program code; the memory and the computer program code configured to, with the processor, cause the apparatus to perform
   obtaining default energy savings plan, wherein the default energy savings plan calls for fully shutting down at least one of cells of a sector or base station of a communication network for a first time period and provides a first amount of energy savings, wherein the sector or base station comprises at least two co-located cells that operate on different frequency bands;
   evaluating energy savings achievable by using partial shutdown in cells of the sector or base station and determining a second time period of partial shutdown that is needed for achieving the first amount of energy savings;
   obtaining a third time period that is usable for energy savings actions; and
   choosing to use partial shutdown in the cells of the sector or base station, if the second time period is shorter than the third time period, and else choosing to use the default energy savings plan.

12. A non-transitory memory medium storing a computer program comprising computer executable program code which when executed by a processor causes an apparatus to perform
   obtaining default energy savings plan, wherein the default energy savings plan calls for fully shutting down at least one of cells of a sector or base station of a communication network for a first time period and provides a first amount of energy savings, wherein the sector or base station comprises at least two co-located cells that operate on different frequency bands;
   evaluating energy savings achievable by using partial shutdown in cells of the sector or base station and determining a second time period of partial shutdown that is needed for achieving the first amount of energy savings;
   obtaining a third time period that is usable for energy savings actions; and
   choosing to use partial shutdown in the cells of the sector or base station, if the second time period is shorter than the third time period, and else choosing to use the default energy savings plan.

\* \* \* \* \*